United States Patent [19]

Cocca et al.

[11] Patent Number: 5,481,331
[45] Date of Patent: Jan. 2, 1996

[54] CONTROL SYSTEM FOR CAMERA WITH MULTIPLE OPTO-SENSORS

[75] Inventors: J. David Cocca, Pittsford; Clay A. Dunsmore, Batavia, both of N.Y.

[73] Assignee: Eastman Kodak Company, Rochester, N.Y.

[21] Appl. No.: 230,589

[22] Filed: Apr. 21, 1994

[51] Int. Cl.$^6$ .............................. G03B 7/00; G03B 7/091
[52] U.S. Cl. ..................................... 354/412; 354/173.11
[58] Field of Search ................................ 354/432, 173.1, 354/173.11, 195.1

[56] References Cited

U.S. PATENT DOCUMENTS

| | | | |
|---|---|---|---|
| 4,216,868 | 8/1980 | Geppert | 212/155 |
| 4,422,745 | 12/1983 | Hopson | 354/105 |
| 4,438,425 | 3/1984 | Tsuchida et al. | 340/55 |
| 4,474,442 | 10/1984 | Shiuzawa | 354/173.11 |
| 5,001,339 | 3/1991 | Starkey et al. | 250/229 |
| 5,177,526 | 1/1993 | Sasayaki et al. | 354/432 |
| 5,231,283 | 7/1993 | Starkey et al. | 250/229 |
| 5,253,008 | 10/1993 | Konishi et al. | 354/402 |

Primary Examiner—Michael L. Gellner
Assistant Examiner—Matthew Miller
Attorney, Agent, or Firm—Francis H. Boos, Jr.

[57] ABSTRACT

In a photographic camera having a plurality of opto-sensors and a microprocessor-based controller, the opto-sensor output signals are coupled via a common bus connection to an input terminal of the controller. A programmably variable output impedance common to the opto-sensors is selectably set for each corresponding selected opto-sensor such that the output signal for each of the selected opto-sensors is at or above a predetermined threshold value at the input to the controller irrespective of differing current output performance of the individual opto-sensors.

6 Claims, 8 Drawing Sheets

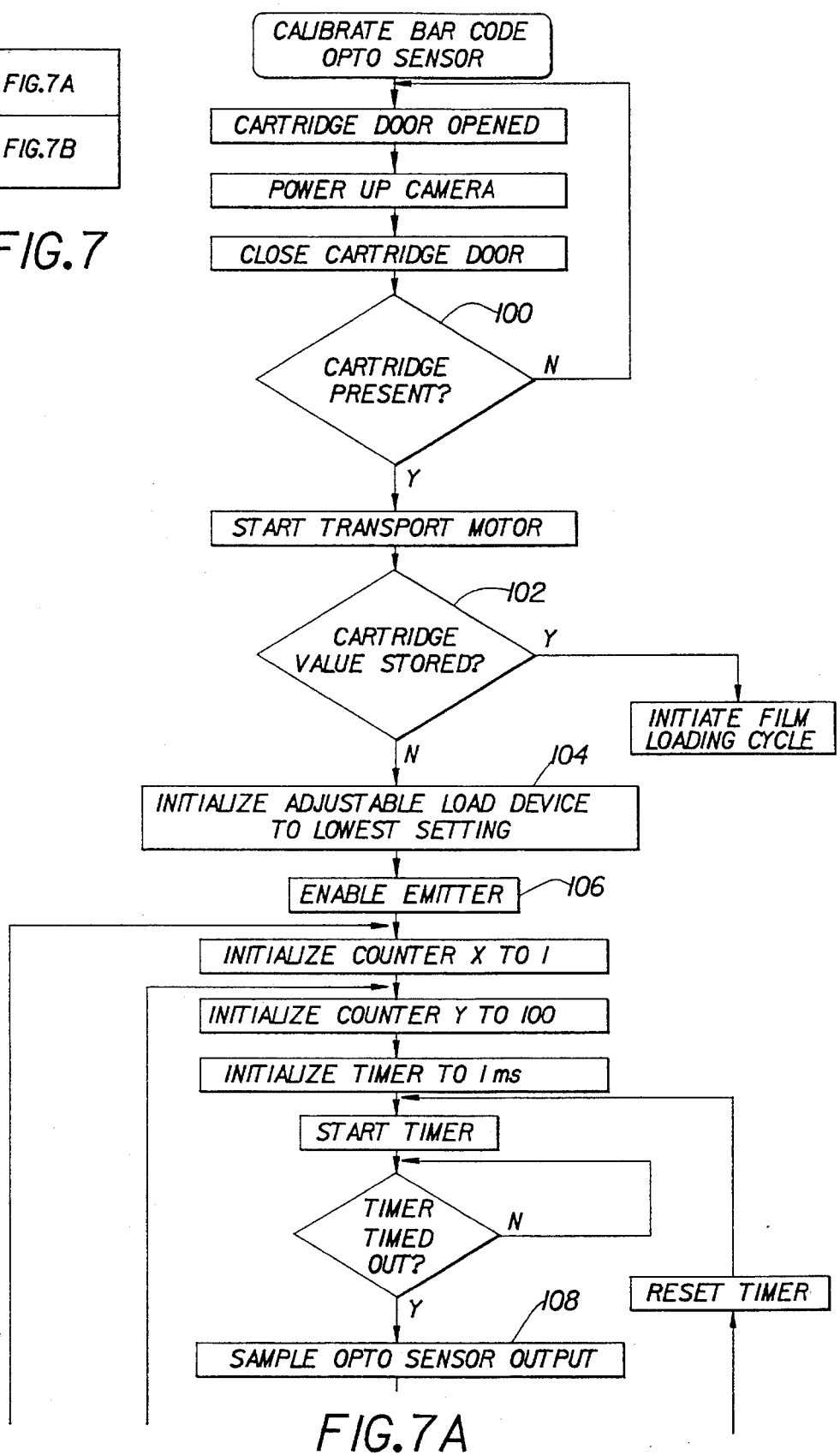

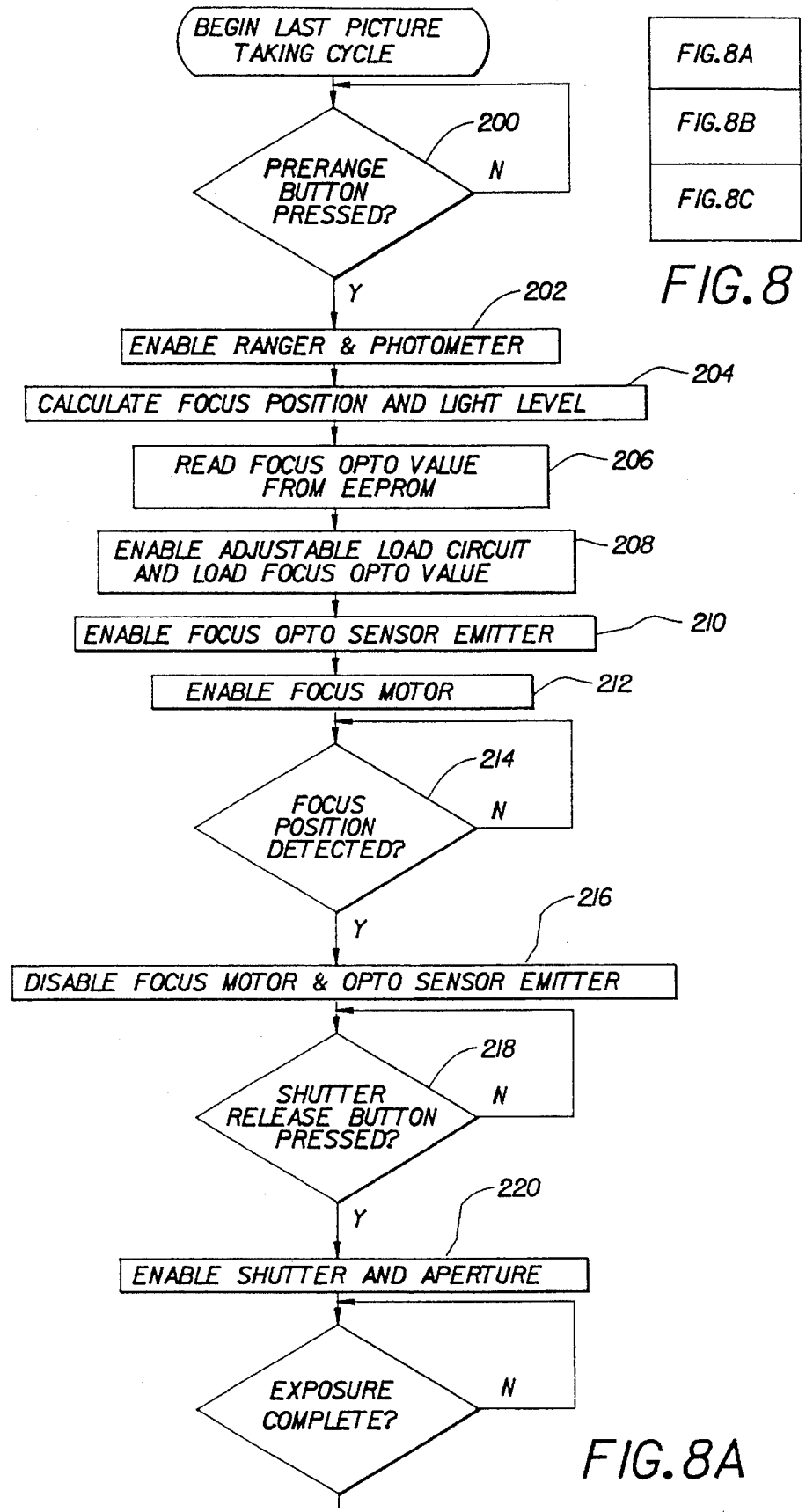

CONTROL SYSTEM FOR CAMERA WITH MULTIPLE OPTO-SENSORS

FIELD OF THE INVENTION

This invention relates generally to the field of photographic cameras, and in particular to cameras utilizing multiple opto-sensors to control various operating functions of the camera.

BACKGROUND OF THE INVENTION

The use of opto-sensors in photographic cameras is well known. They are typically used for such purposes as film metering, setting lens position, reading bar codes, sensing lens parking position, sensing shutter position and the like. When multiple sensors are used in a camera, the outputs of each opto-sensor are connected to a different input terminal of the camera controller (microcomputer). Thus with this arrangement, as shown in FIG. 2, the controller would require as many input pins as there are opto-sensors to be accommodated. It would lower the cost of the controller and simplify operation if the number of input pins were to be reduced.

Ideally, multiple opto-sensors would be provided that uniformly provide output signals that are digital in form (TTL or CMOS). However, due to wide sensor current variations and also due to system tolerance variations caused by such things as differences in reflection or transmission characteristics of the sensed target, distance between sensor and target, tilt, etc., it is difficult to find a single output load impedance value for multiple sensors that would provide adequate and reliable output over the wide range of tolerance variations encountered in actual operation.

It is therefore desirable to provide an opto-sensor input control system for a camera that utilizes a reduced number of input terminals at the camera controller to accommodate multiple opto-sensor inputs. It is further desirable to provide such an input control system that assures that inputs to the camera controller are reliably digital in form irrespective of variations in sensor operation or camera system tolerance variations.

SUMMARY OF THE INVENTION

In accordance with the invention, therefore, there is provided a control system for a camera for controlling the input of signals from a plurality of opto-sensors to a camera controller wherein the control system comprises an opto-sensor bus connector coupling each of the opto-sensors to a common input terminal of the controller, an output load impedance coupled in common to plurality of opto-sensors and to the bus connector, and activating means for selectively activating the opto-sensors to provide selected ones of the opto-sensor signals appearing across the output load impedance to the controller by way of the bus connector. In a preferred form of the invention, the output load impedance is variable and means are provided for varying the load impedance in accordance with the selected opto-sensor to maintain a substantially uniform digital output to the camera controller.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIGS. 7A and 7B are split program flow chart diagrams for the controller of the FIG. 1 camera which are useful in explaining the operation of the present invention in calibrating output of a film cartridge radial bar code sensor in normal operation of the camera.

FIGS. 8A, 8B and 8C are split flow chart diagrams for the FIG. 1 camera controller which are useful in explaining the operation of the present invention during normal picture taking mode of operation.

DETAILED DESCRIPTION OF THE INVENTION

Figure 1:
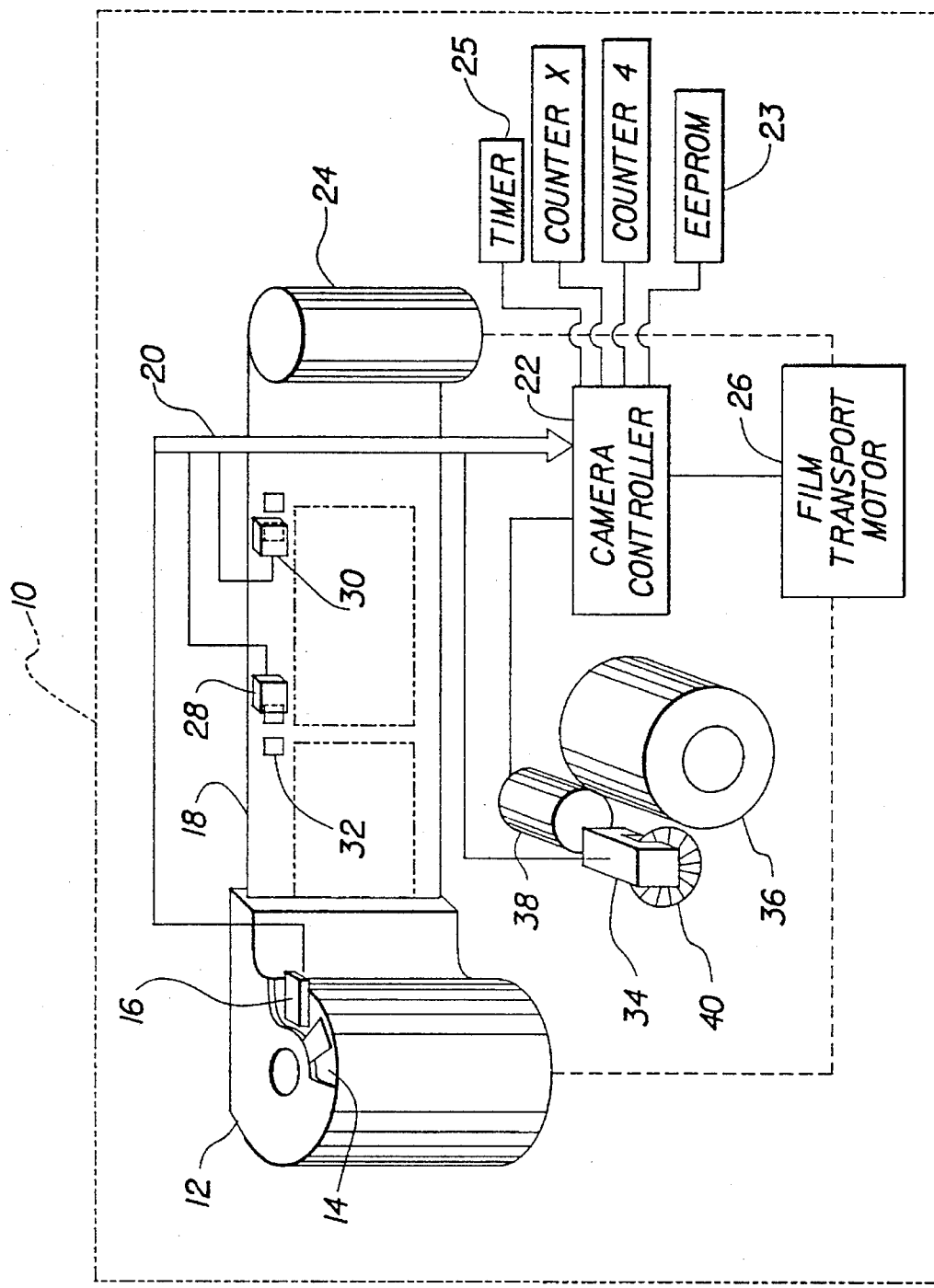
FIG. 1 is a schematic illustration of portions of a camera useful in the practice of the present invention.
Figure 2:
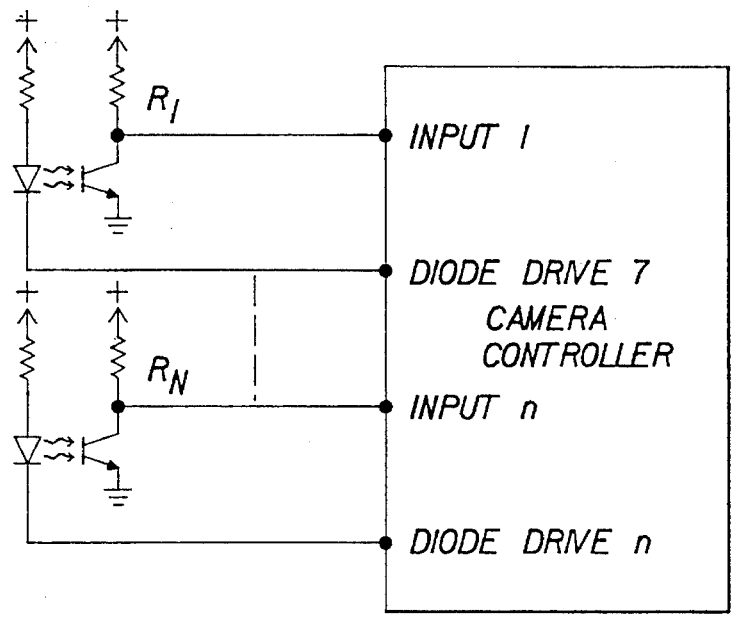
FIG. 2 is a schematic block diagram of a prior art circuit arrangement for connecting opto-sensors to a camera controller.

In FIG. 1 a camera 10 is provided with a cartridge receiving chamber, not shown, for receiving a photographic film cartridge 12. When the cartridge is initially inserted into the camera, bars and spaces on a radial bar code disc 14 are sensed in known manner by an opto-sensor 16 to derive information concerning characteristics of film 18 stored in the cartridge, such as film type, ISO speed, and the length of the filmstrip in terms of number of exposure frames. The signals from opto-sensor 16 are coupled by a bus connector 20 to a camera controller 22 where the signals are decoded to derive the film information. Controller 22 is of well known construction and typically includes a microcomputer and an EEPROM 23. It also includes a pair of counter circuits X and Y and a timer 25 for purposes described below. The signals may also be interpreted by controller 22 to determine, for example from the initial position of the disc 14, whether film in the camera is fresh or has been previously exposed. An arrangement for determining film condition from the initial setting of a radial bar coded disc is found in commonly assigned U.S. patent application Ser. No. 07/988,633, filed Dec. 9, 1992 now U.S. Pat. No. 5321,455; the disclosure of which is incorporated herein by reference.

After loading of the film 18, the film extends to a takeup reel 24. The particular camera embodiment of FIG. 1 is assumed to be a prewind type of camera in which the film 18 is initially thrust out to the takeup spool 24 by operation of a film transport motor 26 drivingly coupled to the central spool of cartridge 12, although it will be understood that the invention is not limited to this type of camera. When the film engages the takeup spool, the transport motor drives the takeup spool to withdraw the film from the cartridge. After the entire roll is withdrawn, all as part of the film loading operation, the film transport motor commences to rewind the film into the cartridge, frame-by-frame, during normal picture taking operation under the control of controller 22. As the film traverses across the camera exposure gate (not shown), opto-sensors 28 and 30 sense the occurrence of film perforations and the resultant signals are coupled via bus connector 20 to controller 22 where they are decoded to be used in controlling metering of the film advance. The signal from opto-sensor 30 may be used to sense film velocity while the signal from opto-sensor 28 may be used to control positioning of the film in the film gate.

Still another opto-sensor 34 may be employed in the camera 10 for the purpose of sensing setting of the taking lens 36. For example, in an auto-focus camera, a focus drive motor operates to move the taking lens into a focused setting causing the rotation of an index wheel 40. The marks on the index wheel are sensed by opto-sensor 34 and the resultant output signals are coupled to controller 22 via bus connector 24 where the signals are decoded to derive control signals applied from the controller 22 to the focus drive motor 38.

Figure 3:
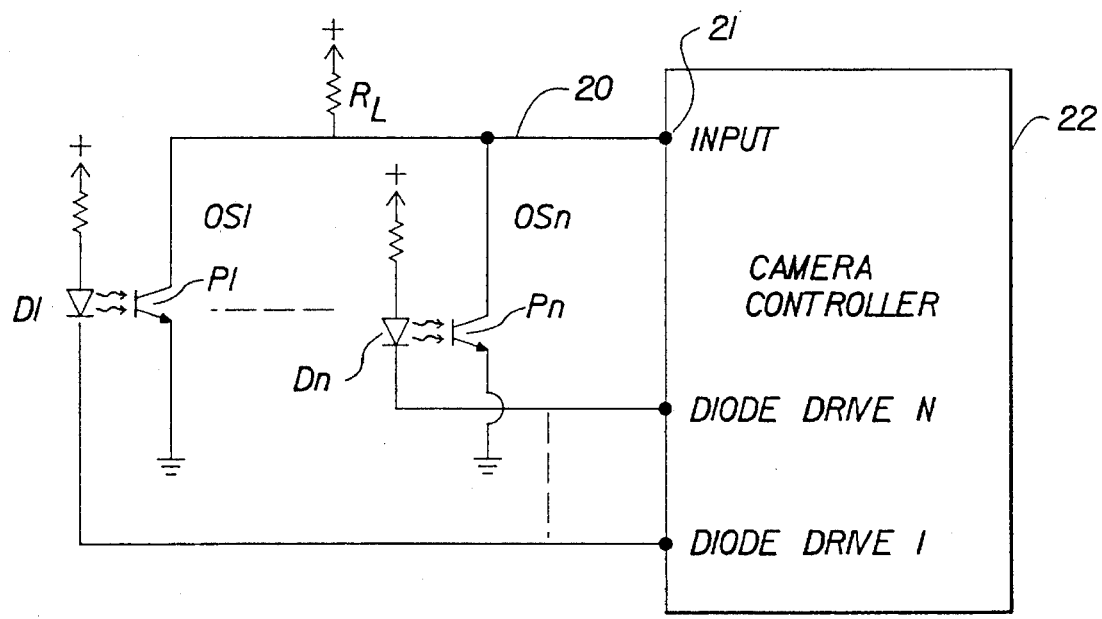
FIG. 3 is a schematic block diagram of a control system in accordance with one feature of the invention for coupling multiple opto-sensors to a camera controller.

In FIG. 3, the schematic arrangement for coupling the opto-sensors to the camera controller 22 is shown. Each of the opto-sensors OS-1 through OS-N, which may correspond to the opto-sensors 16,28,30,34 of FIG. 1, is comprised of an infrared light emitting diode D and a photo-sensor P. In the illustrated arrangement, the collectors of the photosensors are coupled to a common input terminal 21 of the controller 22 via a bus connector 20. An output load impedance $R_L$, across which the output signals from each of the opto-sensors appears, is coupled in common to the collectors of the photosensors, P1 to Pn, and to the bus connector 20. In a well known manner, each of the diodes, D-1 to D-N, is selectively activated by suitably programmed activating means in controller 22 via separate diode drive output pins, 1 to n, of controller 22 at appropriate times to provide selected ones of the output signals appearing across the output load impedance $R_L$ to the controller 22 by way of the bus connector 20. In a preferred arrangement, the diode selection is such that individual ones of the output signals are mutually exclusively provided to the controller.

Figure 4:
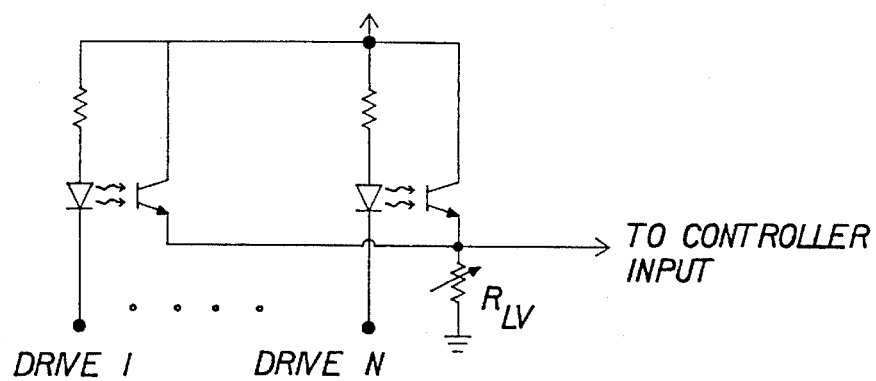
FIG. 4 is a schematic diagram of an alternative arrangement of the present invention representing an improvement in the control system of FIG. 3.

It will be appreciated that an arrangement such as just described provides a simple and cost effective way of inputting opto-sensor data to the camera controller. As long as the current output of all opto-sensors is relative uniform, appropriate uniform digital inputs can be generated in this manner for application to the controller. However, the previously mentioned variations in opto-sensor current performance and in system tolerances make it desirable that the output load impedance be varied to accommodate these variations to produce uniform digital outputs from the various opto-sensor circuits to the controller. Thus, in FIG. 4, a modification of the circuit of FIG. 3 is shown schematically in which a variable output load impedance $R_{LV}$ is employed, in this case on the emitter side of the photosensors, P1 to Pn, to provide uniform digital input to the controller. The determination of whether the output load impedance is connected in the collector or emitter circuits of the photosensors is a matter of design choice.

Figure 5:
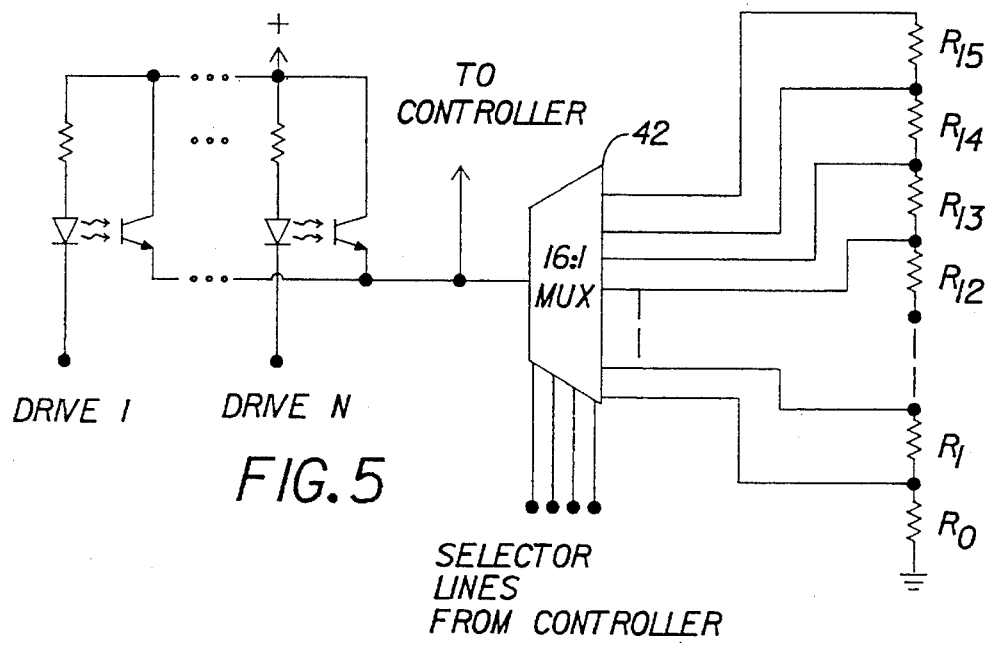
FIG. 5 is a schematic diagram of one preferred embodiment of the present invention utilizing a passive variable output load impedance.
Figure 6:
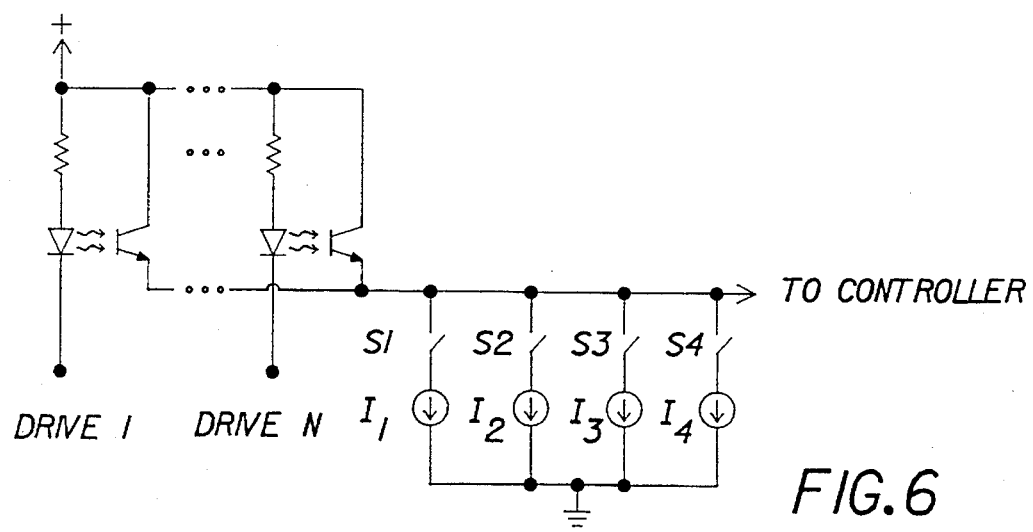
FIG. 6 is a schematic diagram of another preferred embodiment of the present invention utilizing an active variable output load impedance.

FIG. 5 shows one practical embodiment of the control system in which the load impedance consists of a programmably settable digital potentiometer comprised of a multiplexer 42 and a series of resistors $R_0$-$R_{15}$. A series of selector lines, SL1 to SL4, are coupled from the controller to the multiplexer 42 for programmed selection of a suitable impedance value for the particular opto-sensor, the output signal from which is to be applied to the controller. As an alternative to the passive load impedance of FIG. 5, there is shown in FIG. 6 a parallel connected group of constant current drivers $I_1$-$I_4$ which may be selectively activated from controller 22, shown schematically by switches $S_1$-$S_4$, respectively, to provide a suitable constant current sink for the opto-sensor being coupled to the controller. These constant sources, also referred to as current mirrors, may be of the type described in "Analysis and Design of Analog Integrated Circuits" Gray and Meyer,(Wiley Publishers, 2nd Edition), at pages 233 and 709. The advantage that an active load provides, as compared to a passive load, is that it presents a higher equivalent resistance. An active load is also physically smaller than a corresponding passive load, and is therefore easier and less expensive to incorporate in a camera application.

Figure 7B:
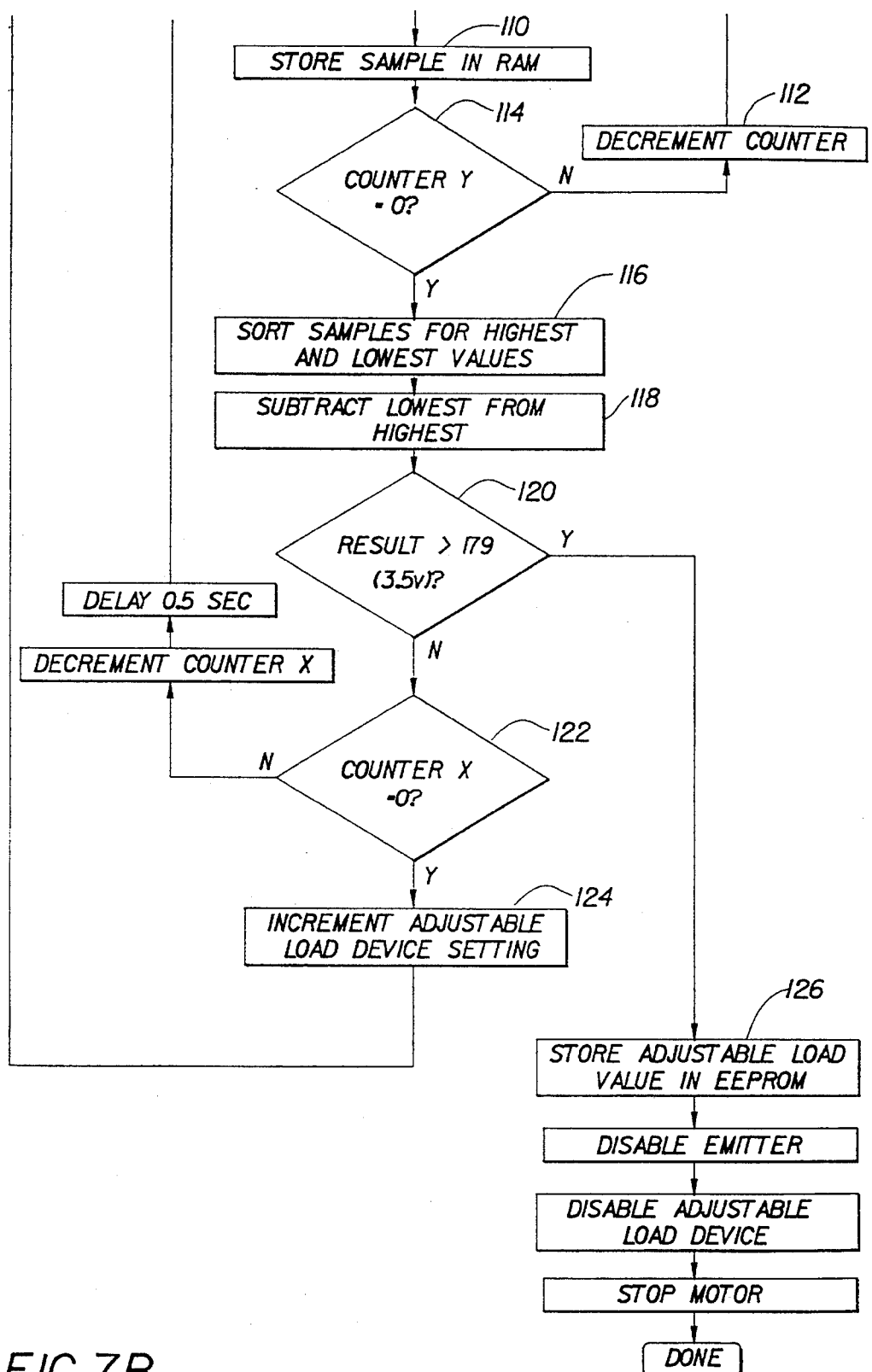

Referring to FIGS. 7A and 7B, there will now be described the manner in which the microprocessor in controller 22 may be programmed to operate in accordance with the present invention. The program flow chart in FIGS. 7A and 7B is directed to calibrating the output impedance value for the radial bar code opto-sensor 16; however, it will be appreciated that similar calibration operation can be performed for the other opto-sensors, such as the focus sensor 34 and perforation sensors 28 and 30, at the time of camera manufacture.

The calibration program is initiated when the cartridge door (or back of the camera) is opened and the camera power is turned on. After the film cartridge is inserted in the cartridge chamber, and the cartridge door is closed, query 100 determines that a film cartridge is present and the film transport motor is then activated. A specific address location in EEPROM 23 is set aside for the storage of an adjustable load value which corresponds to the bar coded disc opto-sensor 16. If query 102 determines that a calibration value has been stored at this address location in the EEPROM, then the program initiates normal film loading operation. If, however, a value has not been stored, then the calibration procedure turns to instruction 104 to initialize the adjustable common impedance load device, coupled to the bus connector 20, setting it to its lowest setting and then to instruction 106 to enable the light emitting diode of the bar code opto-sensor 16. Next, counters, X and Y and timer 25 are initialized in the controller 22. Counter X allows for two sets of readings to be taken within a single rotation of the bar coded disc, the readings being staggered to avoid taking any reading from the synchronizing portion of the disc so that the readings are taken only from the bar-space data segments on the disc. This is to ensure that high-low transitions are read during the calibration rather than just a single value derived from the synchronizing portion of the disc referred to as the "quiet zone". Counter Y sets up the number of samples that are taken for a given data set on the disc. Timer 25 establishes the time between samples, in this case 100 samples at 1 millisecond intervals to encompass several element transitions. The timer 25 is then started.

When timer 25 times out, instruction 108 causes an A/D sample to be taken by the microcomputer of controller 22 from the output of the opto-sensor 16 and at step 110 the value is stored in RAM in the microcomputer. This cycle of taking a sample and storing the resultant value in RAM is repeated with counter Y decremented each time by step 112 until the counter Y is decremented to a count of "0". Each sample may be represented by an 8-bit byte of values ranging from 0–255 based on the input voltage from the sensor. When counter Y equals "0", as determined by query 114, all 100 samples are sorted in step 116 to find the highest and lowest values. The lowest value is then subtracted from the highest value at step 118. If the difference is greater than a predetermined threshold, then the sensor is calibrated. For example, a value of 179 may equal a 3.5v signal delta between a bar and a space on the radial bar coded disc 14. Achieving this value indicates that the output of the opto-sensor across the output load is sufficient to provide the desired digital input to the controller. If this threshold is not achieved as tested by query 120 then counter X is tested at query 122. If the X count is not zero, the program recycles with a predetermined delay, e.g. one-half second, to insure that the quiet zone on disc 14 is not the reason for the value being below the threshold.

If two sets of samples have been taken for a given rotation of the disc as indicated by counter X without reaching the predetermined output threshold, then the adjustable load device is incremented one setting at step 124, the counters and timer are reinitialized and the cycle is iterated repetitively until a load setting is arrived at that results in the threshold value of 179 being reached or exceeded as determined by step 120. The corresponding load setting is then stored in EEPROM 23 at step 126 to be retrieved as needed. The calibration operation is then completed by disabling the opto sensor 16 and the adjustable load device and then stopping the transport motor. If the opto-sensor is part of an actual film loading operation, then, instead of stopping the motor, the program can be set to branch to initiate the film loading cycle.

Figure 8B:
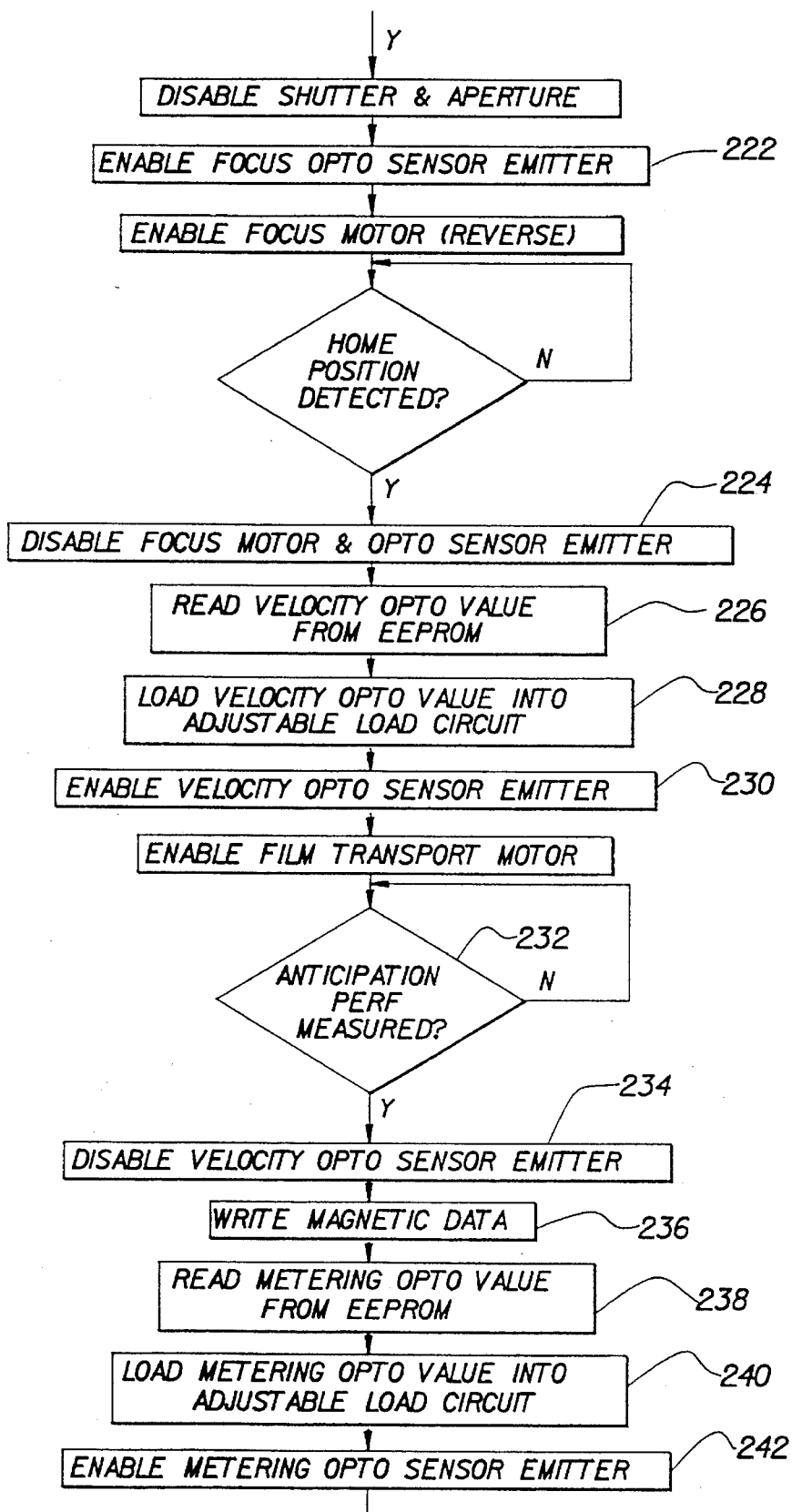
Figure 8C:
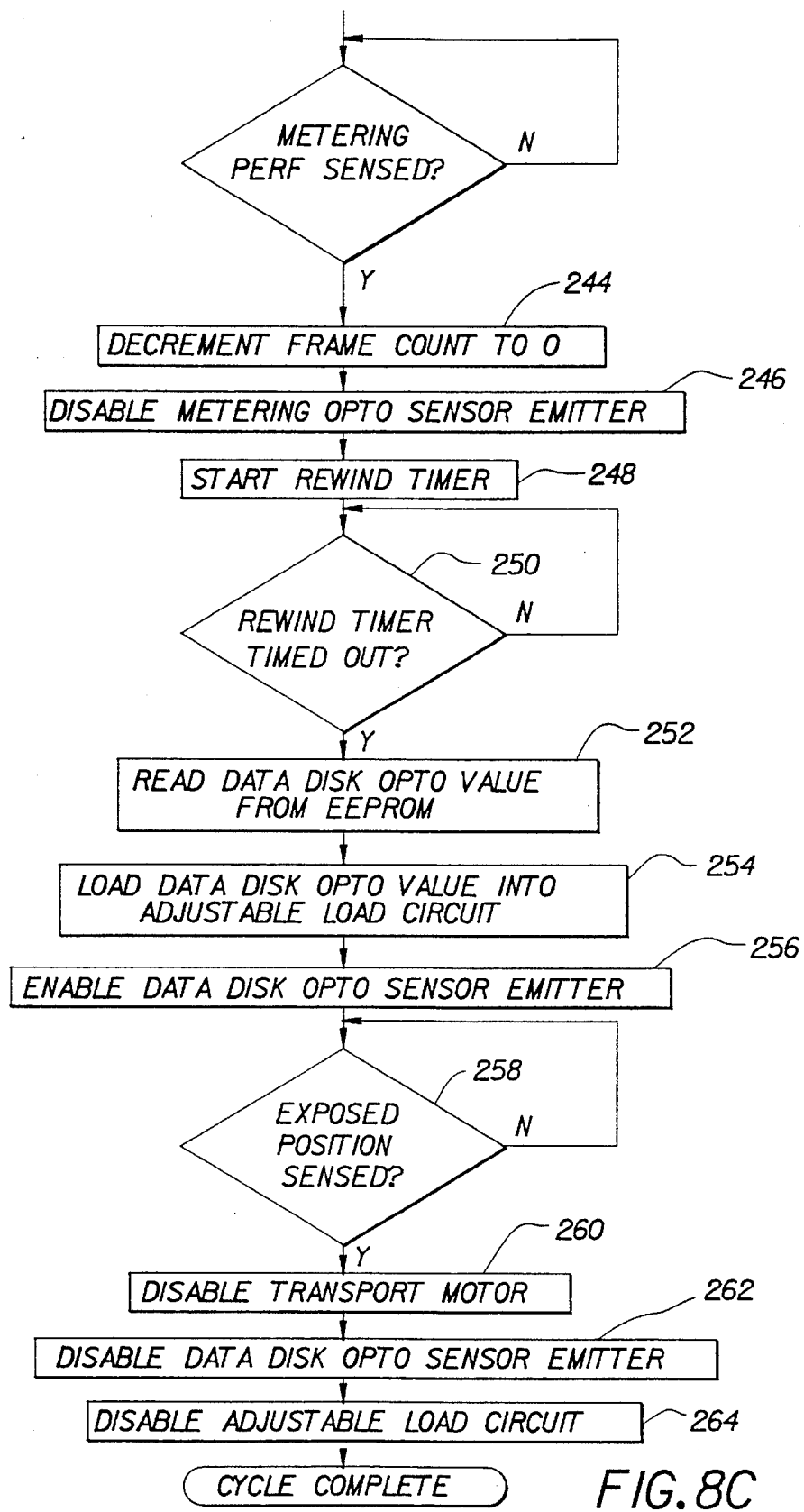

Assuming that each of the opto-sensors in camera 10 have been calibrated in a manner similar to the operation just described, the program flow chart of FIGS. 8A–8C illustrate the manner in which the controller 22 can be programmed to effect operation of camera 10 during a segment of the picture taking mode in accordance with the present invention. For this purpose, it is assumed the camera is at the end of the roll of film and the last available picture frame is about to be exposed.

To begin taking the last picture, a shutter release button on the camera is pressed by the camera operator to the pre-range position sensed by query 200 to enable the distance measuring ranger and photometer. After ranging and light metering operations are complete at steps 202 and 204, the light level and focus position are calculated in the controller in known manner. The adjustable load circuit value for focus opto-sensor 34 is retreived from EEPROM at step 206 and the adjustable load circuit is enabled at this value in step 208 in accordance with the invention. The focus opto-sensor light emitter and the focus drive motor are then enabled at steps 210 and 212. When the motor is enabled, the taking lens 36 travels out and index wheel 40 rotates interrupting the opto-sensor. When the desired lens focus position is reached as tested by query 214, the focus motor and focus opto-sensor light emitter are disabled at step 216. When the shutter release button is fully depressed as tested by query 218, the picture is taken at step 220 in known manner in accordance with an exposure control program. Following the taking of the picture, the focus opto-sensor and focus motor are again enabled at step 222 and the lens is driven to the "home" position, at which point the focus opto-sensor and focus motor are disabled at step 224.

The exposure is now complete and the film transport cycle begins. In accordance with the invention, the impedance value for the velocity opto-sensor 30 is read from EEPROM 23 at step 226 and loaded into the adjustable load circuit at step 228, following which the velocity opto-sensor emitter and film transport motor are enabled at step 230. The controller microprocessor monitors the output of the velocity opto-sensor 30 for the first film perforation that it senses, referred to as an anticipation perforation. Although not a part of the present invention, it is assumed that camera 10 is equipped to magnetically record data in known manner on a layer of magnetic material formed on the film. The output of the velocity opto-sensor 30 is used by the microprocessor to measure the width of the anticipation perf to derive a measure of the film velocity to adjust the timing of the magnetic write data. After the anticipation perf has been measured as tested by query 232, the velocity opto emitter is disabled at step 234 and magnetic recording data on the film begins at step 236.

The camera must now prepare for film metering. Consequently, in accordance the invention, the pre-calibrated value of the load impedance for the metering opto-sensor 28 is read from EEPROM 23 at step 238 and loaded into the adjustable load circuit at step 240 following which the metering opto-emitter is enabled at step 242. The opto-sensor first "sees" the anticipation perf and, after sensing the ensuing metering perf, the microprocessor decrements the counter to "0" at step 244, since the final picture frame has been exposed. The metering opto emitter is then disabled at step 246 and the camera enters the rewind cycle to wind the remainder of the film into the film cartridge 12.

For this purpose, a rewind timer in the controller is started at step 248 to allow the lead of the film to re-enter the film cartridge. After the timer times out as tested by query 250, and in accordance with the invention, the pre-calibrated impedance value for the data disc opto-sensor 16 is read from the EEPROM at step 252 and loaded at step 254 into the impedance circuit. The data disc opto-emitter is enabled at step 256 and the microprocessor begins reading the data disc to find the "exposed" position of the visual exposure indicator on the cartridge, for example in the manner disclosed in commonly assigned U.S. Pat. No. 5,032,854, the disclosure of which is incorporated herein by reference. When the position is sensed at query 258, the transport motor is stopped at step 260, the data disk opto-emitter and adjustable load circuit are disabled at steps 262, 264 and the last picture taking cycle is complete.

The invention has been described with reference to a preferred embodiment. However, it will be appreciated that variations and modifications can be effected by a person of ordinary skill in the art without departing from the scope of the invention as set forth in the following claims.

| PARTS LIST |
|---|
| 10 camera |
| 12 film cartridge |
| 14 radial bar code disc |
| 16 opto-sensor - bar code reading |
| 18 filmstrip |
| 20 bus connector |
| 21 opto-sensor input pin on controller 22 |
| 22 camera controller |
| 23 EEPROM |
| 24 takeup spool |
| 25 timer |
| 26 film transport motor |
| 28 opto-sensor - film metering |
| 30 opto-sensor - velocity sensing |
| 32 film perforations |
| 34 opto-sensor - lens focus |
| 36 taking lens |
| 38 focus drive motor |
| 40 focus index wheel |
| 42 multiplexer |

What is claimed is:

1. A control system for a camera for controlling input of signals from a plurality of opto-sensors to a camera controller comprising:

an opto-sensor bus connector coupling each of the opto-sensors to a common input terminal of said controller;

an effective output load impedance coupled in common to said plurality of opto-sensors and to said bus connector; and activating means for selectively activating said opto-sensors to provide selected ones of said opto-sensor signals appearing across said output load effective impedance to said controller input terminal by way of said bus connector.

2. A control system according to claim 1 in which said activating means is operative to mutually exclusively activate said opto-sensors to provide individual ones of said signals to said controller input terminal.

3. A control system according to claim 1 in which said effective output load impedance comprises a variable effective impedance and the system further includes means for activating said effective impedance to a predetermined value dependent on the selected ones of said opto-sensors activated by said activating means.

4. A control system according to claim 3 in which said effective output load impedance comprises a programmably settable digital potentiometer.

5. A control system according to claim 3 in which said effective output load impedance comprises a plurality of selectable constant current drivers.

6. A control system for a photographic camera having a camera controller and a plurality of opto-sensors including a data disc opto-sensor positioned in the camera to sense bars and spaces on said data disc; the control system comprising:

an opto-sensor bus connector coupling each of the opto-sensors to a common input terminal of said controller;

a programmably selectable output effective load impedance coupled in common to said plurality of opto-sensors and to said bus connector; and activating means for selectively activating said opto-sensors to provide selected ones of said opto-sensor signals appearing across said output load effective impedance to said controller input terminal by way of said bus connector;

said plurality of opto-sensors having respectively different output currents in response to sensing each opto-sensor's respective target objects; and said controller being programmed to calibrate said effective output load impedance by selecting respectively different effective impedance values for at least two of said selected opto-sensors which produce respective sensor output signals of at least a predetermined threshold value at the input terminal of the camera controller.

* * * * *

UNITED STATES PATENT AND TRADEMARK OFFICE
CERTIFICATE OF CORRECTION

PATENT NO. : 5,481,331
DATED : January 2, 1996
INVENTOR(S) : J. D. Cocca, et al

It is certified that error appears in the above-indentified patent and that said Letters Patent is hereby corrected as shown below:

Col. 8, line 8,   --effective-- should appear before "output"

Col. 8, line 13,   --effective-- should appear before "output"

Signed and Sealed this

Eleventh Day of June, 1996

Attest:

BRUCE LEHMAN

Attesting Officer       Commissioner of Patents and Trademarks